March 24, 1925. Re. 16,027

I. T. ENGLISH

BAG CLOSER

Original Filed Jan. 12, 1921 3 Sheets-Sheet 1

Inventor
Ira T. English

By Shurtleff & Mason
Attorneys

March 24, 1925. Re. 16,027

I. T. ENGLISH

BAG CLOSER

Original Filed Jan. 12, 1921 3 Sheets-Sheet 2

Inventor
Ira T. English

By Shinkevant & Mann
Attorneys

March 24, 1925. Re. 16,027

I. T. ENGLISH

BAG CLOSER

Original Filed Jan. 12, 1921 3 Sheets-Sheet 3

Inventor
Ira T. English

By Hunterand Mason

Attorneys

Reissued Mar. 24, 1925. Re. 16,027

UNITED STATES PATENT OFFICE.

IRA T. ENGLISH, OF PORTLAND, OREGON, ASSIGNOR TO UNION SPECIAL MACHINE COMPANY, OF CHICAGO, ILLINOIS, A CORPORATION OF ILLINOIS.

BAG CLOSER.

Original No. 1,475,759, dated November 27, 1923, Serial No. 436,730, filed January 12, 1921. Application for reissue filed March 13, 1924. Serial No. 699,071.

*To all whom it may concern:*

Be it known that I, IRA T. ENGLISH, a citizen of the United States, residing at Portland, in the county of Multnomah and State of Oregon, have invented certain new and useful Improvements in Bag Closers, of which the following is a description, reference being had to the accompanying drawing and to the figures of reference marked thereon.

This invention relates more particularly to devices for closing cloth bags after they have been filled.

The object of my invention is to minimize the amount of labor entailed in the packing, weighing and closing of bags.

I attain these results in the manner described in the following specification and illustrated in the accompanying drawings, in which—

Similar numbers of reference refer to the same or similar parts throughout the several views.

Figure 1:
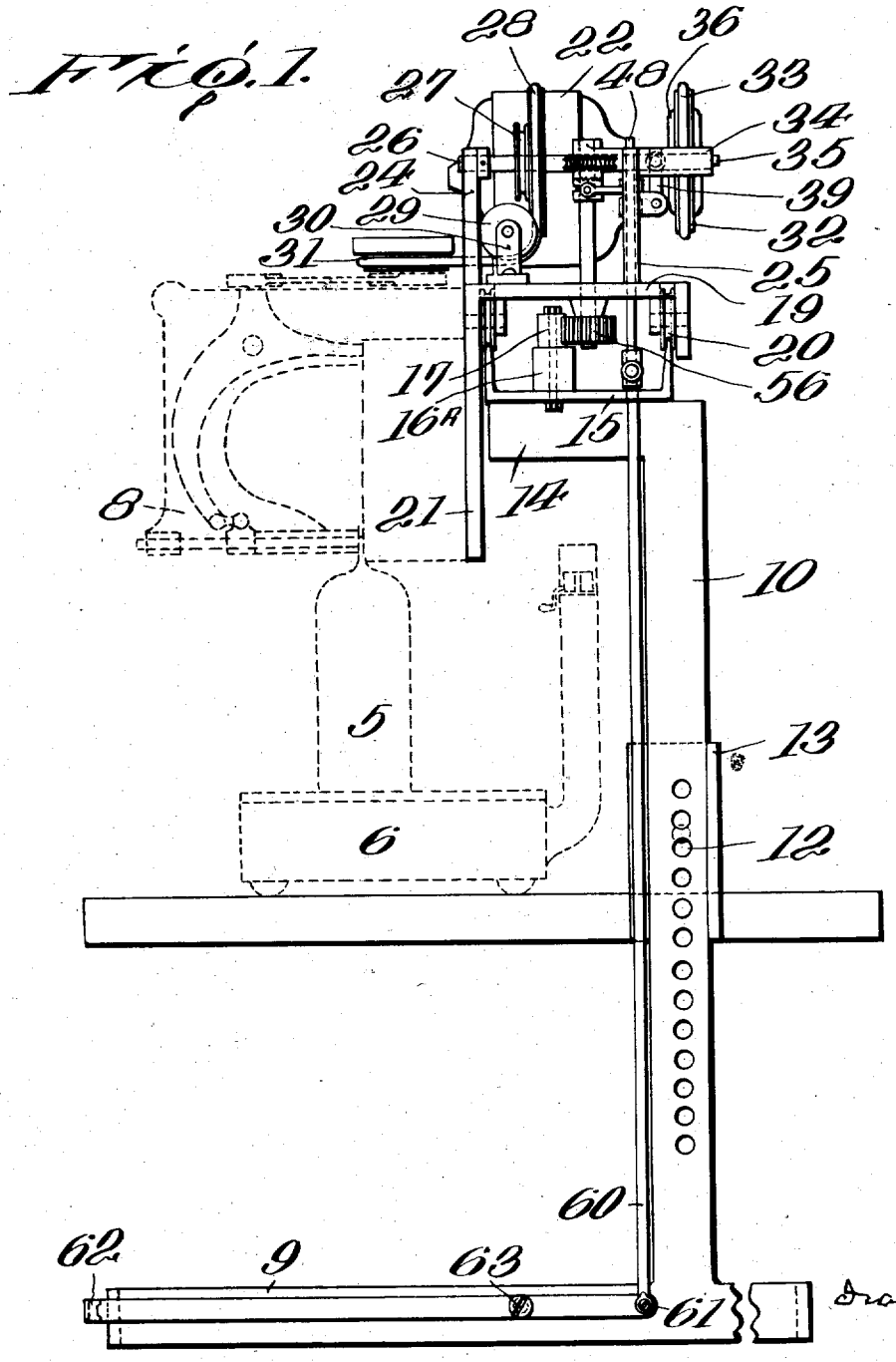
Figure 1 is a side elevation of the device, and Fig. 2 a front elevation.
Figure 2:
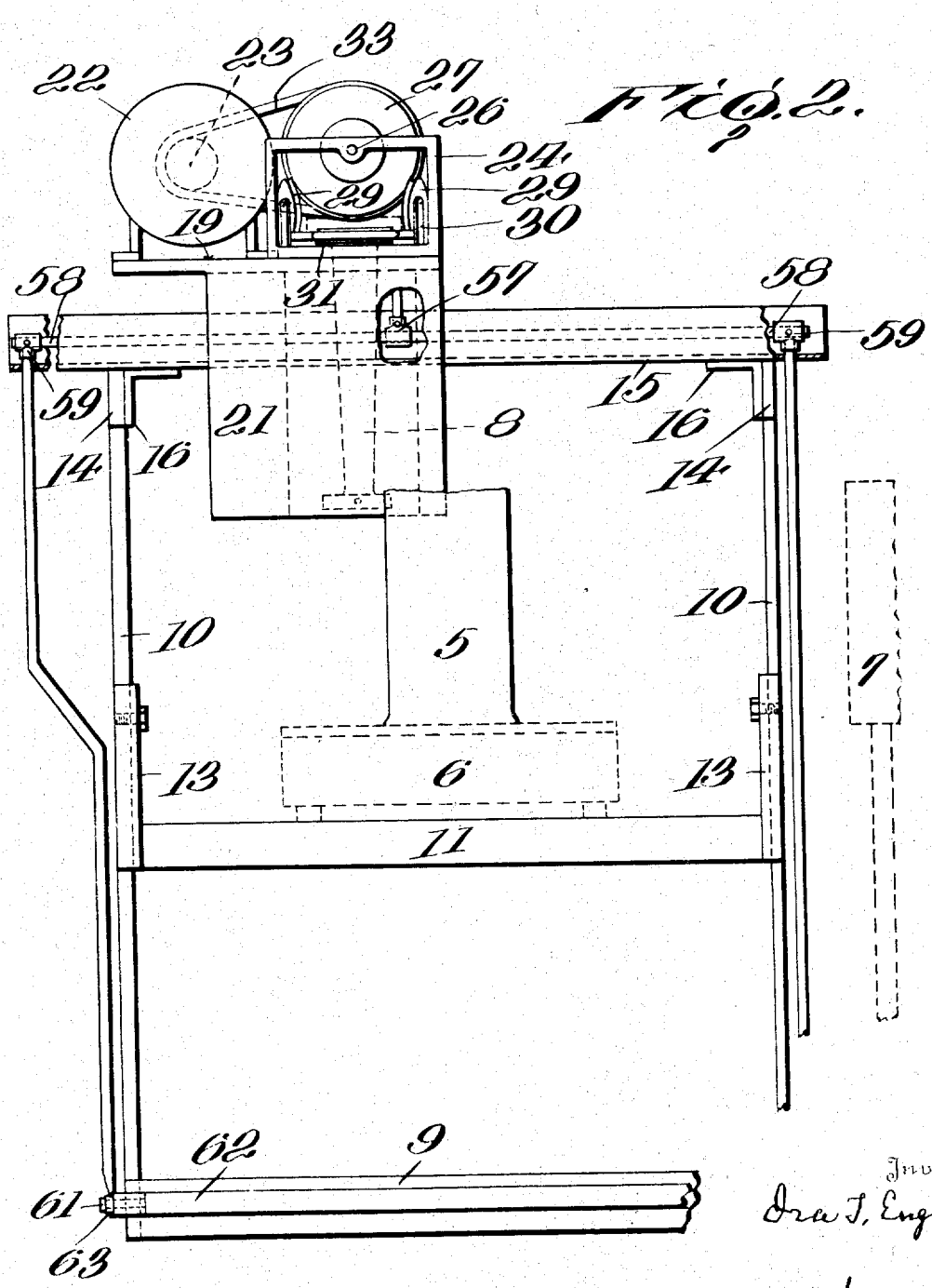
Figure 3:
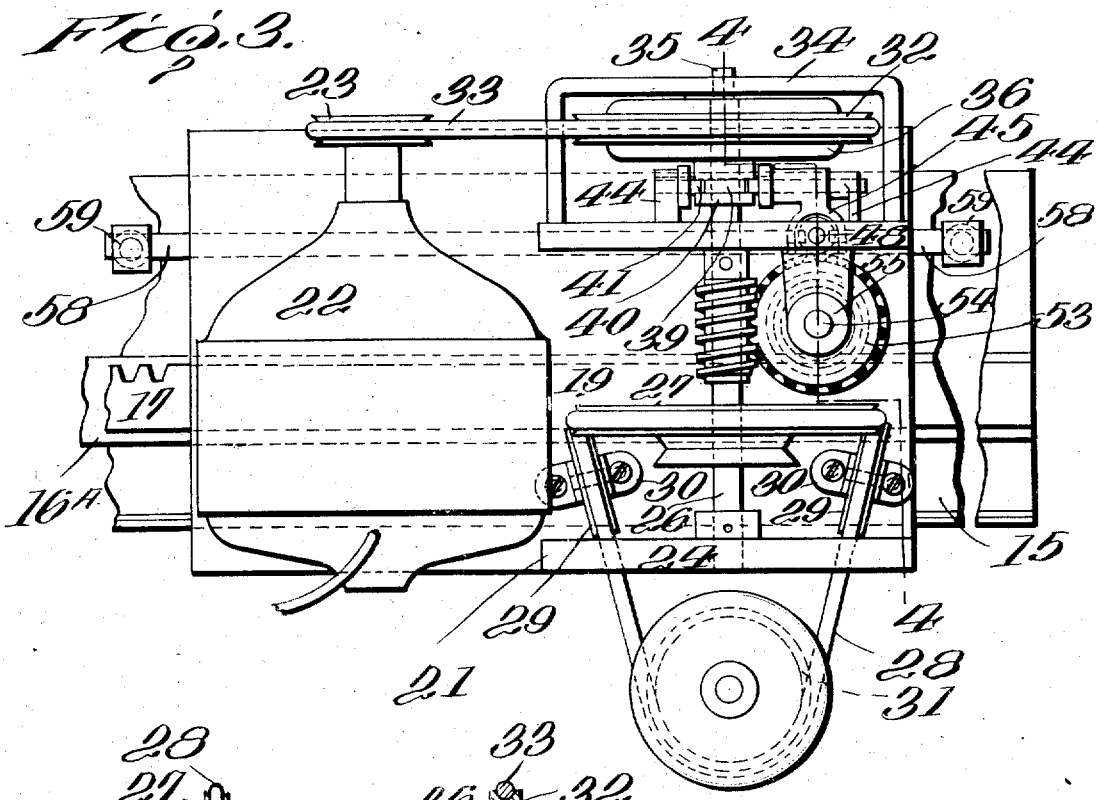
Fig. 3 is an enlarged plan of the device.
Figure 4:
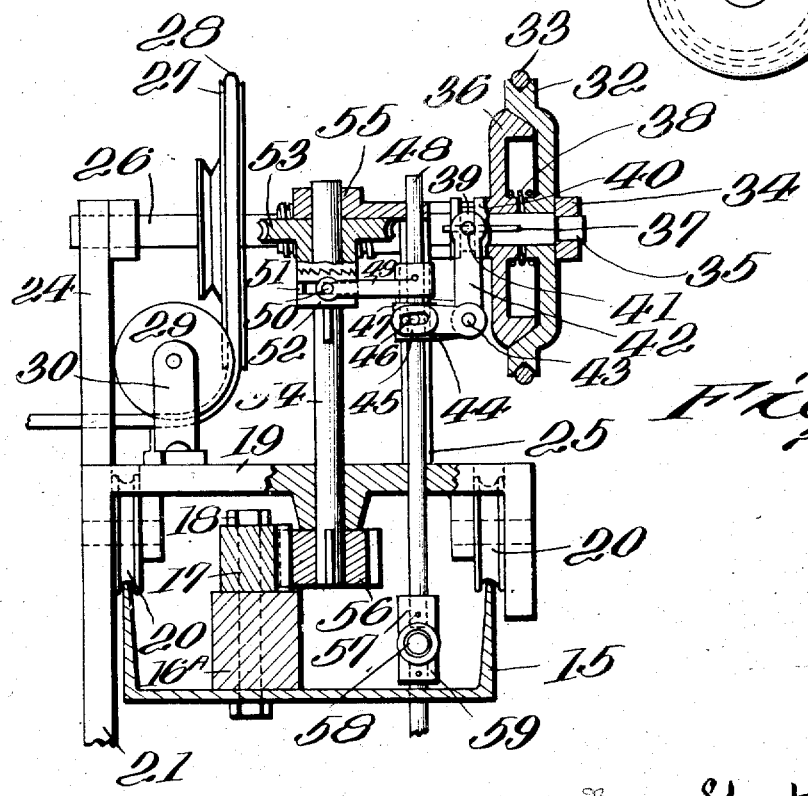
Fig. 4 is an enlarged sectional elevation along the line 4—4 of Fig. 3.

Referring in detail to the drawings, it will be understood that this device is to be used in connection with any suitable packing or filling machine which introduces nearly the required amount of material into the sack 5. This sack is now placed upon a scale 6 where it is accurately weighed and additional material added from the box 7, if required.

At the present time a sewing machine head 8 is commonly employed in the art. This head has a horizontal needle held at a height which will correspond with the height of the sack 5. At the present time this head is held stationary and the sack 5 is usually fed toward same on a traveling belt or conveyor. One operator of the sewing machine thereby closes sacks for a number of different packers, in which method many difficulties are encountered. In order to avoid these difficulties I have constructed my machine as follows—

On the horizontal base 9 I have erected a pair of vertical standards 10 which act as guides for a platform 11 upon which a weighing scale 6 is placed so that a bag while resting on said scale may be closed. Said platform is made vertically adjustable by means of the holes 12 in the standards 10 and the slide 13 of the scale platform 11. Bridging across the horizontal portions 14 of the standards 10 is the channel iron track 15 joined to said horizontal members by means of the short angle irons 16. Upon the bottom of the channel track 15 is secured a strip of wood or metal 16A upon which is secured a rack 17 by means of the bolts 18 which pass through the bottom of the channel 15. A horizontally moving carrier or carriage member 19 carrying the rollers 20 which engage the sides of the channel track 15 is supplied with an apron 21 to which is secured the sewing head 8. It will be seen that the sewing head is now movable in a direction at right angles to the needle and in a straight line back and forth over the platform of the weighing scale.

On the rearward end of the carriage member 19 I have mounted a motor 22 equipped with a pulley 23. On the forward end of the member 19 I have erected the standards 24 and 25 which support the horizontal shaft 26 upon which is mounted a step pulley 27 over which is passed a round belt 28 which passes around the idler wheels 29 on the standards 30 which are secured to the member 19 and then around the pulley 31 of the sewing head 8. Near the opposite end of the shaft 26 I have placed a clutch pulley 32 which is slidably mounted on the shaft and driven by the belt 33 from the pulley 23 of the motor 22. A bracket 34 supports the shouldered end 35 of the shaft 26 and is supported by the member 25.

A clutch cone 36 is slidably mounted on the shaft 26 and is secured against rotation by the spline 37. The clutch cone 36 is adapted to engage the interior face of the pulley 32 and is held out of engagement with same by means of the spring 38. A groove 39 formed in the hub 40 of the member 36 engages the pins 41 in the lever 42 which is mounted on the shaft 43 in the brackets 44 which are secured to the side of the member 25. A forked lever 45 is also attached to the shaft 43 and engages the pins 46 projecting from the collar 47.

The collar 47 is secured to a vertically movable shaft 48 also carrying the forked arm 49 whose pins 50 engage the slot 51 in the clutch collar 52. When raised this clutch collar engages similar teeth on the under side of a hub of a worm wheel 53. This worm wheel and clutch collar are mounted on a vertical shaft 54 whose upper end journals in the bearing 55 projecting from the member 25. The lower end of the shaft 54 is supported by the member 19 beneath which it carries a pinion 56 which meshes with the rack 17. The clutch collar 52 is slidably mounted on the shaft 54 and splined thereon.

The shaft 48 guides at its upper end in the member 25 and near its middle in the member 19. A T-shaped member 57 is secured to the lower end of the shaft 48 and is adapted to slide loosely upon the horizontal rod 58 supported at its outer ends in the T-shaped members 59 which are carried on the upper ends of the rods 60. These rods are joined at their lower end 61 to a foot treadle 62 having its fulcrum 63 near its center.

The operation of my device is as follows:—After the sack 5 has been brought to almost the correct weight by the packer it is placed upon the scale 6 where it is brought up to requirements in weight, as before explained. The operator, or packer as he is known in the art, now places an empty sack under his packing machine and turns his attention to the sack which is ready for sewing. With his hands he brings the mouth of the sack 5 between the presser foot of the feed plates of the sewing head in the usual manner and then by depressing the treadle 62 with his foot he raises the shaft 48 and thereby throws the cone 36 into engagement with its pulley 32 which now rotates the shaft 26, which in turn drives the needle. At the same time the clutch collar 52 is brought into engagement with the worm wheel 53, and the pinion 56 is thereby caused to rotate and propel the carriage 19 along on its track 15 at the correct sewing speed.

When it is desired to temporarily sew sacks which are to be again opened before being shipped it is only necessary to reverse the step pulley 27 and use a shorter belt which will produce a longer stitch than secured by the use of the large pulley.

Only one clutch mechanism would be required were it not for the fact that the needle should be working before the feeding action is begun, the object being to sew a short chain of stitches at both ends of the seam, which acts as a lock for the closing seam and prevents unraveling. It is preferable to sew about one inch of this chain of stitches before and after the needle enters and leaves the cloth. When using this machine the head is moved up to the sack and the needle is operated a number of times before the feeding operation takes place. On completion of the sewing seam the operator, by permitting the foot treadle 62 to rise, stops both the feed and the needle when a chain of stitches of sufficient length has been produced.

This construction precludes the possibility of the operator leaving too short a chain at the beginning of a seam with the result that if the sack is handled roughly the seam will unravel and cause a loss of the contents of the bag.

It will be observed that there are numerous ways in which these results could be attained, but I have illustrated this particular form as best illustrating the invention set forth in the claims following, in which—

I claim:

1. In a carriage for traveling sewing heads, the combination of a track, a carriage mounted on said track, a motor mounted on said carriage, a main shaft driven by said motor and mounted transversely on said carriage, a clutch interposed between said main shaft and motor, a reduction gear driven from said main shaft and mounted on a vertical shaft, a pinion secured to the lower end of said vertical shaft, a rack secured to said track and meshing with said pinion, a clutch interposed between said driving shaft and said pinion, and a foot treadle means arranged to actuate both clutches almost simultaneously, said main shaft clutch coming into engagement slightly before the feed operating clutch.

2. In a machine for sewing sacks, the combination of a sewing head having a horizontal needle with a supporting frame secured to said head and provided with grooved wheels, a channel iron whose side members form tracks for said wheel, side supports for said channel iron, a horizontal main shaft carried by said frame transversely to said track, a motor on said frame adapted to rotate said main shaft, a friction clutch between said motor and shaft, a pulley secured on said main shaft and arranged to drive said sewing head, a vertical shaft bearing in said frame, a worm on said main shaft driving a worm wheel on said vertical shaft, a claw clutch on said vertical shaft adapted to lock said worm wheel to said vertical shaft, a pinion on said vertical shaft on the under side of said frame, a rack on said channel iron between the tracks adapted to mesh with said pinion, and a treadle mechanism adapted to actuate said friction and claw clutches.

3. A filled bag sewing machine including in combination, a supporting frame, a track carried by said frame, a carriage mounted on said track and movable back and forth in a straight line over a filled bag supported beneath the same, a sewing head mounted on said carriage and depending therefrom in front of said track for stitching the mouth of said bag, a motor mounted on said carriage over said track and traveling with said carriage, and means on said carriage and operated by the motor for actuating the sewing head and for moving the carriage positively during the stitching of the filled bag.

4. A filled bag sewing machine including in combination, a supporting frame, a track carried by said frame, a carriage mounted on said track and movable back and forth in a straight line over a filled bag supported beneath the same, a sewing head mounted on said carriage and depending therefrom in front of said track for stitching the mouth of said bag, a motor mounted on said carriage over said track and traveling with said carriage, and means on said carriage and operated by the motor for actuating the sewing head and for moving the carriage positively during the stitching of the filled bag, a treadle, and devices actuated by said treadle for connecting the motor to the actuating means for moving the carriage and to the actuating means for operating the sewing head.

5. A filled bag sewing machine including in combination, a supporting frame, a track carried by said frame, a carriage mounted on said track and movable back and forth in a straight line over a filled bag supported beneath the same, a sewing head mounted on said carriage and depending therefrom in front of said track for stitching the mouth of said bag, a motor mounted on said carriage over said track and traveling with said carriage, and means on said carriage and operated by the motor for actuating the sewing head and for moving the carriage positively during the stitching of the filled bag, a treadle, and devices actuated by said treadle for connecting the motor to the actuating means for moving the carriage and to the actuating means for operating the sewing head, and means for disconnecting the motor from the sewing head actuating means and the carriage actuating means when said treadle is released.

6. A filled bag sewing machine including in combination, spaced standards, a track carried by said standards, a carriage mounted on said track and movable back and forth in a straight line over a filled bag supported beneath the same, a sewing head mounted on said carriage and depending therefrom in front of said track for stitching the mouth of the bag, a motor mounted on said carriage over said track and traveling therewith, means mounted on the carriage and operated by the motor for actuating the sewing head and for moving the carriage positively during the stitching of the filled bag, a treadle, devices actuated by said treadle for connecting the motor to the actuating means for moving the carriage and to the actuating means for operating the sewing head, and means for disconnecting the motor from the sewing head actuating means and the carriage actuating means when said treadle is released, said treadle controlling means being so constructed that the treadle may be actuated for connecting or disconnecting the motor from the part actuated thereby at any point in the travel of the carriage.

7. A filled bag sewing machine including in combination, spaced supporting standards, a track carried by said standards, a carriage mounted on said track and movable back and forth in a straight line over a filled bag supported beneath the carriage, a sewing head mounted on said carriage and depending therefrom in front of said track for stitching the mouth of the bag, a motor mounted on said carriage over said track, a transverse shaft on said carriage adapted to be operated by said motor, actuating devices adapted to be connected to said transverse shaft for operating the sewing head, actuating devices adapted to be operated by said transverse shaft for moving the carriage in a forward direction, a treadle, and means controlled thereby for connecting said transverse shaft to the sewing head and connecting said transverse shaft to the carriage actuating means at the will of the operator.

8. A filled bag sewing machine including in combination, spaced supporting standards, a track carried by said standards, a carriage mounted on said track and movable back and forth in a straight line over a filled bag supported beneath the carriage, a sewing head mounted on said carriage and depending therefrom in front of said track for stitching the mouth of the bag, a motor mounted on said carriage, a transverse shaft on said carriage adapted to be operated by said motor, actuating devices adapted to be connected to said transverse shaft for operating the sewing head, actuating devices adapted to be operated by said transverse shaft for moving the carriage, said last-named actuating devices including reduction gearing whereby said carriage is adapted to travel in proper timing for stitching.

In testimony whereof, I affix my signature.

IRA T. ENGLISH.